(12) United States Patent
Shin et al.

(10) Patent No.: US 10,099,678 B2
(45) Date of Patent: Oct. 16, 2018

(54) METHOD OF CONTROLLING HYBRID ELECTRIC VEHICLE

(71) Applicants: HYUNDAI MOTOR COMPANY, Seoul (KR); Kia Motors Corporation, Seoul (KR)

(72) Inventors: Hong Chul Shin, Seoul (KR); Sang Don Lee, Suwon-si (KR); Kyung Hun Hwang, Suwon-si (KR); Jae Young Choi, Seoul (KR); Jong Bum Oh, Gwacheon-si (KR)

(73) Assignees: HYUNDAI MOTOR COMPANY, Seoul (KR); Kia Motors Corporation, Seoul (KR)

( * ) Notice: Subject to any disclaimer, the term of this patent is extended or adjusted under 35 U.S.C. 154(b) by 172 days.

(21) Appl. No.: 15/379,926

(22) Filed: Dec. 15, 2016

(65) Prior Publication Data

US 2018/0099654 A1    Apr. 12, 2018

(30) Foreign Application Priority Data

Oct. 6, 2016    (KR) .................. 10-2016-0128794

(51) Int. Cl.
*B60W 20/10*    (2016.01)
*B60W 10/08*    (2006.01)
(Continued)

(52) U.S. Cl.
CPC ............ *B60W 20/10* (2013.01); *B60K 6/547* (2013.01); *B60W 10/08* (2013.01); *B60W 10/10* (2013.01); *B60W 10/11* (2013.01); *B60W 20/30* (2013.01); *B60W 30/19* (2013.01); *B60K 2006/4825* (2013.01); *B60W 2510/081* (2013.01); *B60W 2540/103* (2013.01); *B60W 2710/083* (2013.01);
(Continued)

(58) Field of Classification Search
None
See application file for complete search history.

(56) References Cited

U.S. PATENT DOCUMENTS

2011/0112709 A1    5/2011  Park et al.

FOREIGN PATENT DOCUMENTS

DE    102007002739 A1    7/2008
EP      1104712 A2    6/2001
(Continued)

*Primary Examiner* — Mussa A Shaawat
*Assistant Examiner* — Abdhesh K Jha
(74) *Attorney, Agent, or Firm* — Knobbe Martens Olson & Bear LLP

(57) ABSTRACT

Provided is a method of controlling a hybrid electric vehicle capable of improving acceleration response upon kick-down. The method includes calculating a rising gradient of a motor speed increasing during kick-down shift based on a present speed of a motor for driving the vehicle which is detected at a control unit in real time, upon detection of demand of kick-down shift due to acceleration operation of a driver, calculating a falling gradient of intervention torque based on the rising gradient of the motor speed at the control unit, determining an entry point of intervention control based on the present speed of the motor detected at the control unit in real time, and performing torque intervention control for controlling driving of the motor in order to output intervention torque, namely, motor torque decreased based on the falling gradient of intervention torque calculated from the determined entry point at the control unit.

9 Claims, 5 Drawing Sheets

(51) Int. Cl.
*B60W 10/10* (2012.01)
*B60W 20/30* (2016.01)
*B60K 6/547* (2007.10)
*B60W 10/11* (2012.01)
*B60W 30/19* (2012.01)
*B60K 6/48* (2007.10)

(52) U.S. Cl.
CPC . *B60W 2710/10* (2013.01); *B60W 2710/1005* (2013.01); *B60Y 2300/20* (2013.01); *B60Y 2300/66* (2013.01); *B60Y 2400/112* (2013.01); *Y10S 903/93* (2013.01)

(56) References Cited

FOREIGN PATENT DOCUMENTS

| | | |
|---|---|---|
| EP | 2671751 A1 | 12/2013 |
| JP | 2000-23309 A | 1/2000 |
| JP | 2011-11667 A | 1/2011 |
| JP | 2011-20503 A | 2/2011 |
| JP | 2014-69603 A | 4/2014 |
| JP | 2014-125054 A | 7/2014 |
| KR | 10-2009-0114218 A | 11/2009 |
| KR | 10-2014-0005545 A | 1/2014 |
| KR | 10-2014-0048579 A | 4/2014 |
| KR | 10-1500245 B1 | 3/2015 |

US 10,099,678 B2

METHOD OF CONTROLLING HYBRID ELECTRIC VEHICLE

CROSS-REFERENCE TO RELATED APPLICATION

This application claims priority to Korean Patent Application No. 10-2016-0128794, filed on Oct. 6, 2016 in the Korean Intellectual Property Office, the disclosure of which is incorporated herein by reference.

BACKGROUND

1. Field

The preset disclosure relates to a method of controlling a hybrid electric vehicle.

2. Description of the Related Art

A hybrid electric vehicle is a vehicle using at least two different driving sources. Generally, the hybrid electric vehicle is driven by a fuel-powered combustion engine and a battery-powered electric motor.

FIG. 1 is a view illustrating a powertrain configuration of a transmission mounted electric device (TMED)-type hybrid electric vehicle. As illustrated, in the TMED-type hybrid electric vehicle, a motor is mounted at a transmission side such that an output shaft of the motor is connected to an input shaft of the transmission.

Hereinafter, the configuration will be described. The TMED-type hybrid electric vehicle includes an engine 1 and the motor 3 as driving sources for driving the vehicle, an engine clutch 2 disposed between the engine 1 and the motor 3, the transmission 4 connected to the output shaft of the motor 3, an inverter 5 driving the motor 3, and a battery 6 as a power source of the motor 3 while being chargeably/dischargeably connected to the motor 3 through the inverter 5.

Reference numeral 7 in FIG. 1 indicates a hybrid starter generator (HSG) connected to the engine 1 in a power transferable manner to start the engine 1 and generate electricity using the power of the engine 1.

The engine clutch 2 is selectively connected between the engine 1 and the motor 3 in a power transferable manner depending on coupling or uncoupling motions by hydraulic pressure. In order to drive the motor 3, the inverter 5 converts a direct current of the battery 6 into a three-phase alternating current and applies the three-phase alternating current to the motor 3.

Furthermore, the transmission 4 shifts the power of the engine 1 and motor 3 to transmit the shifted power to a driveshaft.

The hybrid electric vehicle including the described components is driven in an electric vehicle (EV) mode only using the power of the motor 3 or in a hybrid electric vehicle (HEV) mode complexly using the power of the engine 1 and the power of the motor 3.

Furthermore, when putting on the brake or when coasting by inertia, regenerative braking (RB) in which inertial energy of the vehicle is recovered through operation of electricity generation of the motor to charge the battery (the motor charge), is performed.

Furthermore, a hybrid control unit (HCU) as a superordinate control unit, for controlling the entire operation of the vehicle, is mounted at the hybrid electric vehicle. Various control units for controlling various components of the vehicle are mounted at the hybrid electric vehicle.

For example, an engine control unit (ECU) for controlling operation of the engine, a motor control unit (MCU) for controlling operation of the motor, a transmission control unit (TCU) for controlling operation of the transmission, a battery management system (BMS) collecting information on a battery state to use the information to control charge/discharge of the battery or to provide the information to other control units, and a brake control unit for controlling braking of the vehicle are provided.

The hybrid control unit and the other control units mutually exchange information through CAN communication to perform cooperative control with respect to a device in the vehicle. The superordinate control unit collects various information from subordinate control units to transmit control commands to the subordinate control units.

Meanwhile, when the driver operates an accelerator pedal in a tip-in manner for acceleration, kick-down (K/D) shift control, in which the transmission control unit (TCU) allows downshift based on present speed and a value of an accelerator position sensor (APS), is performed.

Herein, the transmission control unit (TCU) requests torque intervention control to the hybrid control unit for a decrease in an absolute value of torque transmitted to an input side of the transmission in order to cancel out shock generated by radical change of torque at an output side of the transmission when the end of kick-down shift.

The hybrid control unit (HCU) transmits signals to the engine control unit (ECU) and the motor control unit (MCU) and controls the engine and the motor to output intervention torque at the input side of the transmission.

The disclosure of this section is to provide background of the invention. Applicant notes that this section may contain information available before this application. However, by providing this section, Applicant does not admit that any information contained in this section constitutes prior art.

SUMMARY

In accordance with one aspect of the present disclosure, the above and other objects can be accomplished by the provision of a method of controlling a hybrid electric vehicle including a) calculating a rising gradient of a motor speed increasing during kick-down shift based on a present speed of a motor for driving the vehicle which is detected at a control unit in real time, upon detection of demand of kick-down shift due to acceleration operation of a driver, b) calculating a falling gradient of intervention torque based on the rising gradient of the motor speed at the control unit, c) determining an entry point of torque intervention control based on the present speed of the motor detected at the control unit in real time, and d) performing torque intervention control for controlling driving of the motor in order to output intervention torque, namely, motor torque decreased based on the falling gradient of intervention torque calculated from the determined entry point at the control unit.

In a preferred embodiment, the method may further include detecting an initial motor speed, namely, a speed before shift of the motor upon detection of demand of kick-down shift due to the acceleration operation of the driver to determine a target gearshift speed, namely, a target motor speed at a completion point of kick-down shift at the control unit, calculating a difference value between the initial motor speed and the target gearshift speed at the control unit, determining a predetermined maximum motor torque limitation values respectively corresponding to the target gearshift speed and the initial motor speed in a usable power region of a present battery at the control unit, determining a difference value between a maximum motor torque limitation value at the initial motor speed and a maximum motor torque limitation value at the target motor speed at the control unit, and comparing the difference value between the maximum motor torque limitation values with a predetermined threshold value, wherein, when the difference value between the maximum motor torque limitation values is equal to or more than the threshold value, steps a) to d) may be performed at the control unit.

In another preferred embodiment, the control unit may determine that the entry point of torque intervention control is a point in which the present motor speed detected in real time reaches a predetermined entry reference speed.

In still another preferred embodiment, the method may further include detecting an initial motor speed, namely, a speed before shift of the motor upon detection of demand of kick-down shift due to the acceleration operation of the driver to determine a target gearshift speed, namely, a target motor speed at a completion point of kick-down shift at the control unit, wherein the entry reference speed may be determined by a difference value between the initial motor speed and the target gearshift speed at the control unit.

In yet another preferred embodiment, a first speed ratio value corresponding to a difference value between the initial motor speed and the target gearshift speed may be obtained by a map at the control unit, the entry reference speed may be calculated by adding the initial motor speed to a value obtained by multiplying the difference value between the initial motor speed and the target gearshift speed by the first speed ratio value.

In another preferred embodiment, the method may further include detecting an initial motor speed, namely, a speed before shift of the motor upon detection of demand of kick-down shift due to the acceleration operation of the driver to determine a target gearshift speed, namely, a target motor speed at a completion point of kick-down shift at the control unit, wherein the falling gradient of intervention torque may be determined by the rising gradient of the motor speed, the initial motor speed, and the target gearshift speed.

In still another preferred embodiment, the rising gradient of the motor speed and the falling gradient of intervention torque corresponding to a second speed ratio value which is a ratio value of the initial motor speed with respect to the target gearshift speed, may be determined at the control unit using a map.

In yet another preferred embodiment, the method may further include terminating torque intervention control at the control unit when the present speed of the motor increasing during kick-down shift reaches the target gearshift speed.

In still another preferred embodiment, after termination of torque intervention control, anti-jerk control may be performed, and the anti-jerk control may include, by the control unit, obtaining an actual speed of a driveshaft in which torque of the motor is output, calculating a model speed of the driveshaft, obtaining a vibration element based on deviation between the obtained actual speed of the driveshaft and the calculated model speed, calculating vibration reduction compensation torque for reducing vibration of the driveshaft from the vibration element, and controlling driving of the motor to output motor torque compensated by the calculated vibration reduction compensation torque.

In yet another preferred embodiment, the hybrid electric vehicle may include a transmission mounted electric device (TMED)-type hybrid electric vehicle in which a transmission is disposed at an output side of the motor.

Other aspects and preferred embodiments of the disclosure are discussed infra.

It is understood that the terms "vehicle", "vehicular" and other similar terms as used herein are inclusive of motor vehicles in general such as passenger automobiles including sport utility vehicles (SUV), buses, trucks, various commercial vehicles, watercraft including a variety of boats and ships, aircraft, and the like, and include hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the disclosure are discussed infra.

BRIEF DESCRIPTION OF THE DRAWINGS

The above and other features of the present disclosure will now be described in detail with reference to certain exemplary embodiments thereof illustrated the accompanying drawings which are given hereinbelow by way of illustration only, and thus are not limitative of the present disclosure, and wherein.

Figure 1:
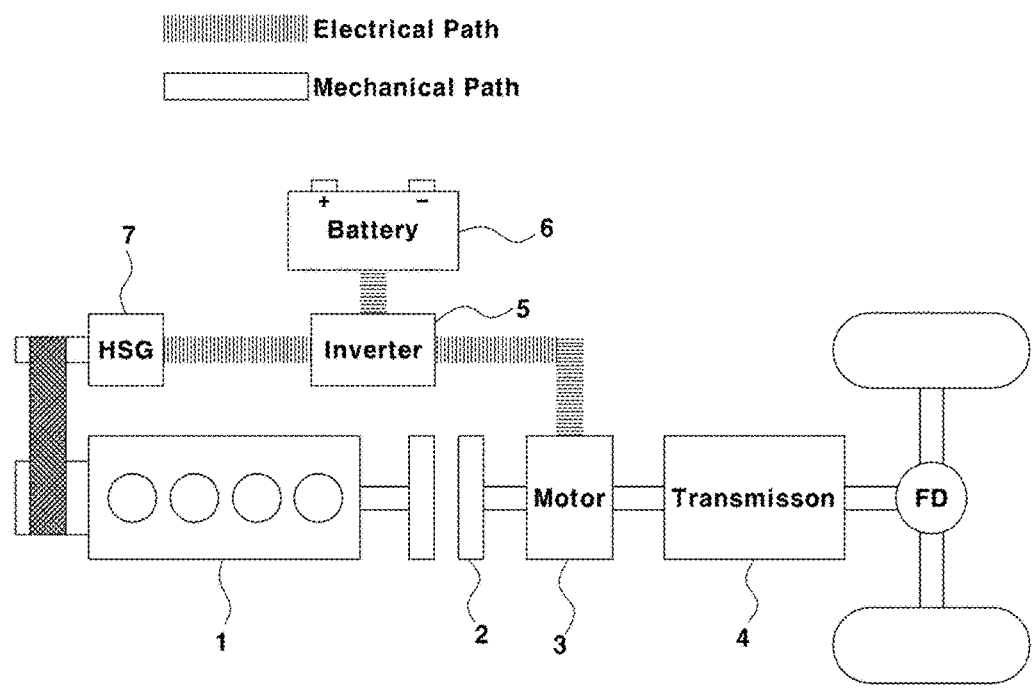
FIG. 1 is a view schematically illustrating a powertrain configuration of a hybrid electric vehicle.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION OF THE PREFERRED EMBODIMENTS

Reference will now be made in detail to various embodiments of the present disclosure, examples of which are illustrated in the accompanying drawings and described below, so that a person having ordinary skill in the art to which the present disclosure relates can easily put the present disclosure into practice. The present disclosure, however, can be embodied in various different forms and are not limited to embodiments which will be described hereinafter.

Unless explicitly stated to the contrary, the word "comprise," "comprises" or "comprising" used throughout the specification will not be understood as the exclusion of the other elements but to imply the inclusion of the other elements.

The present disclosure provides a method of controlling a hybrid electric vehicle capable of improving acceleration response upon kick-down shift based on acceleration will of a driver.

In the present disclosure, kick-down (K/D) means a case (herein, performing rapid acceleration of the vehicle) performing automatic shift to a lower gearshift (e.g. from a sixth gear to a fifth gear or from the sixth gear to a fourth gear) when the driver presses the accelerator pedal for rapid acceleration of the vehicle.

Figure 2:
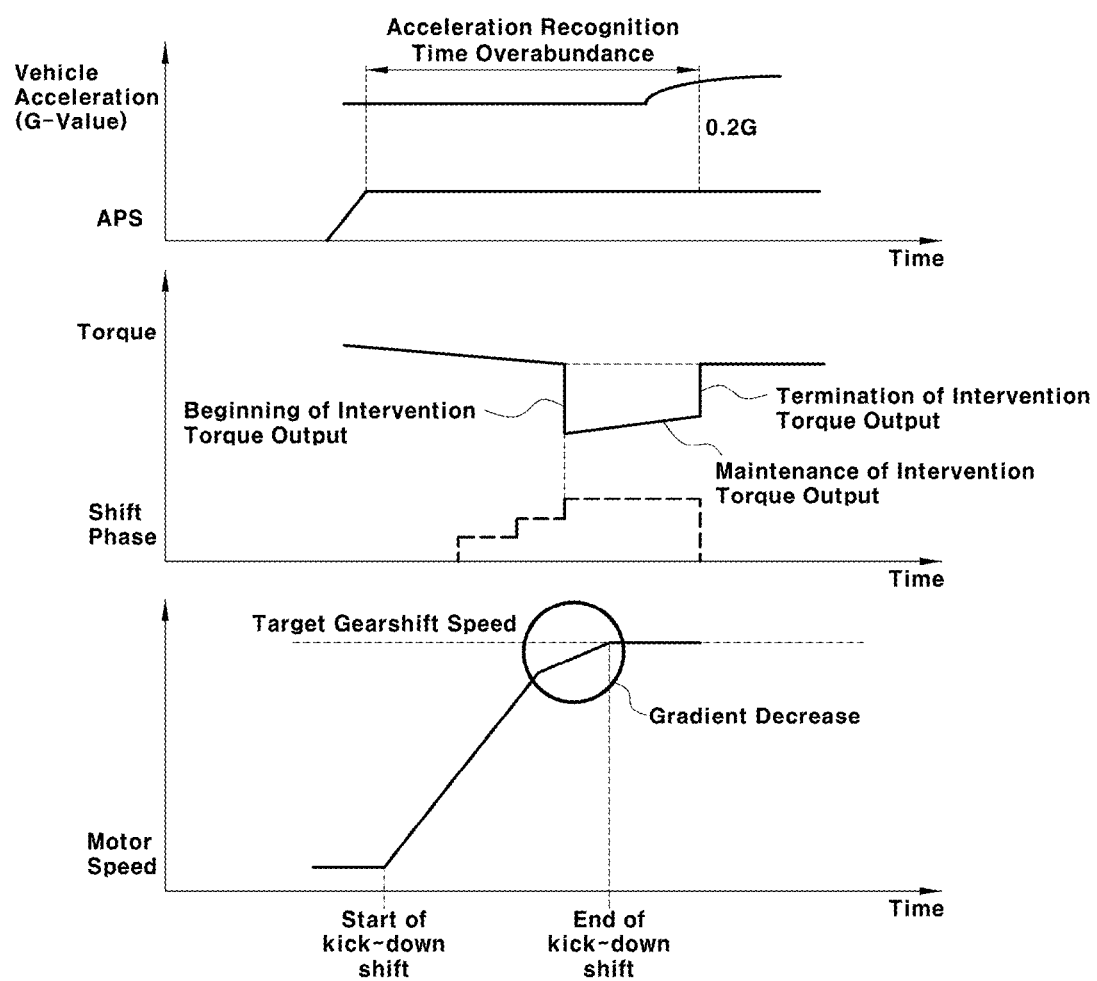
FIG. 2 is a view illustrating a control method upon kick-down shift.

Referring to FIG. 2, a control method upon kick-down shift of the hybrid electric vehicle will be described in detail.

First, it may be shown that the APS value is increased when the driver operates accelerator pedal in a tip-in manner for acceleration. Time (acceleration recognition time) from a point of operation of tip-in to a point in which the driver recognizes an increase in actual acceleration of the vehicle (e.g. an increase to 0.2 G of acceleration) is provided.

Furthermore, FIG. 2 illustrates that, after the transmission control unit requests torque intervention control to the hybrid control unit in a process of kick-down shift using the transmission control unit, torque intervention, in which motor torque transmitted to the input side of the transmission at the end of actual shift is decreased based on the control command of the hybrid control unit, is performed.

Decreased motor torque transmitted to the input side of the transmission by torque intervention control is referred to as intervention torque. As illustrated in FIG. 2, intervention torque is output at the input side of the transmission from the motor at the end of kick-down shift.

In addition, in the case that rapid acceleration due to operation of the accelerator pedal of the driver is required, a target gearshift speed corresponding to a gearshift which is targeted upon kick-down shift is determined. Referring to FIG. 2, it may be shown that a motor speed increases until the determined target gearshift speed is reached.

Generally, when the driver operates the accelerator pedal in a tip-in manner for acceleration, the transmission control unit performs kick-down shift control while torque intervention control outputting intervention torque determined at the input side of the transmission from the driving source (i.e. the motor) of the vehicle is requested to the hybrid control unit. Thus, the hybrid control unit performs torque intervention control in which motor torque is decreased to intervention torque.

Generally, considering inaccuracy of coupling hydraulic pressure of the transmission, absence of a damping component of the powertrain of the TMED hybrid system, hardware deviation, and influence of vehicle disturbance, the transmission control unit requests rough intervention torque based on required torque and speed at the output side of the transmission.

In this case, in a region of high acceleration will of the driver, intervention torque is excessively output to decrease a sense of acceleration at the end of actual shift in the TMED hybrid system without a torque converter (i.e. the damping component).

That is, as illustrated in FIG. 2, in the case of kick-down shift control using the transmission control unit, after termination of shift, intervention torque (decreased motor torque) is excessively, continuously output. Accordingly, intervention torque continuously output at the end of shift affects wheels of the vehicle to decrease driving force of the vehicle.

When torque is output to the wheels to decrease driving force of the vehicle, there is a disadvantage in acceleration maintenance of the vehicle. Finally, as illustrated in FIG. 2, time for recognizing acceleration after the driver depresses the accelerator pedal increases such that there is a disadvantage in marketability of the vehicle.

Furthermore, as illustrated in FIG. 2, regardless of acceleration will (the absolute value of the APS or a gradient of change of the APS value) of the driver, when a predetermined constant shift phase is reached, entry of torque intervention is performed. As illustrated in FIG. 2, in this case, a rising gradient of the motor speed of the end of shift is decreased through back pressure control of release hydraulic pressure in order to prevent shock at the end of kick-down shift. Thus, the decrease in the rising gradient of the motor speed prevents time reduction of actual shift.

Namely, as the rising gradient of the motor speed is decreased, time is increased until the target gearshift speed is reached. As a result, there is disadvantage in shift time such as an increase in actual shift time and an increase in shift completion time. In addition, driving performance of the vehicle is negatively affected by the above-described issue.

The control process of the hybrid electric vehicle according to the present disclosure may be performed by cooperative control of a plurality of control units in the vehicle via communication. Herein, the control units in the vehicle may include a transmission control unit (TCU) performing control of kick-down shift of the transmission, a hybrid control unit (HCU) as a superordinate control unit, a motor control unit (MCU) controlling operation of a motor, and a battery management system (BMS) collecting information on a battery state to use the information to control charge/discharge of the battery or to provide the information to other control units.

Furthermore, the control process of the hybrid vehicle according to the present disclosure may be performed by an integrated control unit.

Figure 5:
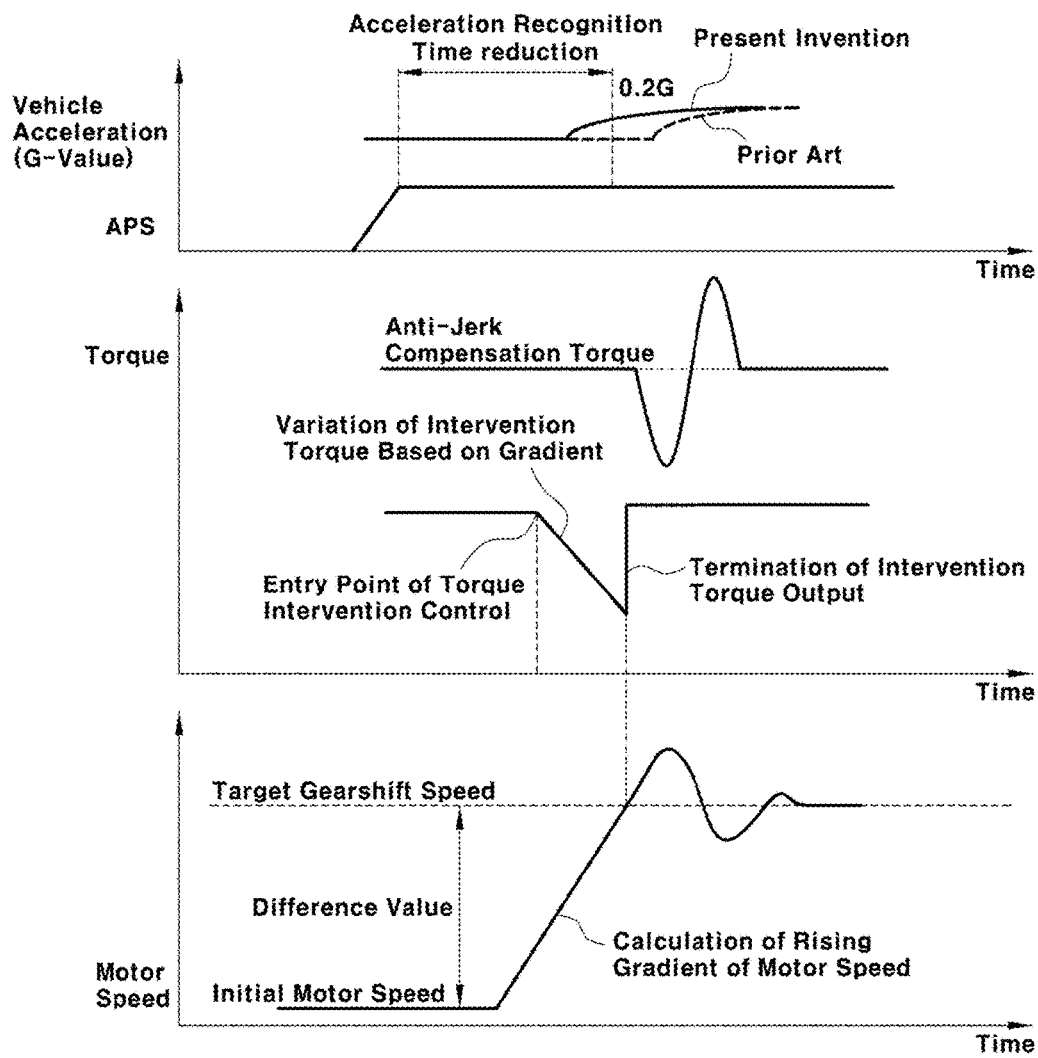
FIG. 5 is a view illustrating intervention torque, anti-jerk compensation torque, and the motor speed in the control process according to the illustrated embodiment of the present disclosure.

Referring to FIGS. 2 and 5, a control method upon kick-down shift of the hybrid electric vehicle will be described in detail. In the control process of the present disclosure, when a kick-down shift is commanded, the hybrid control unit (HCU) determines whether a difference Diff2 between the motor torque limitation value at the initial motor speed NI and the motor torque limitation value at the target gearshift speed is greater than a predetermined threshold value. If the difference Diff2 is less than the predetermined threshold value, the rate of increase of the motor speed at the end of a gear shift may be decreased through a control or operation of the transmission control unit (TCU). More specifically, back pressure control of hydraulic pressure of the transmission is performed in order to prevent shock at the end of kick-down shift, as shown in FIG. 2. In other words, the transmission control unit (TCU) may control the transmission to decrease the motor speed at the end of kick-down shift to prevent shock at the end of kick-down shift.

If the difference Diff2 is greater than the predetermined threshold value, a rate of increase of the motor speed at the end of a gear shift is not decreased through a control or operation of the transmission control unit (TCU). That is, the rate of increase of the motor speed is not decreased prior to the motor speed reaching the target gearshift speed, as shown in FIG. 5. As a result, the time required for the motor to reach the target gearshift speed is reduced which improves vehicle acceleration (i.e., relative to the above described kick-down shift that decreases the rate of increase of the motor speed).

Further, in embodiments, the torque output of the motor is modified to provide an increasingly negative torque that has a maximum negative torque applied when the motor speed is equal to the target gearshift speed and/or when the kick-down shift of the transmission is completed in order to prevent shock at the end of kick-down shift, as shown in FIG. 5. That is, the torque output of the motor decreases in magnitude from a value at the start of the kick-down shift and/or a point after the start of the kick-down shift to a maximum decreased value at the end of the kick-down shift. Accordingly, shock at the end of the kick-down shift is inhibited or prevented while the time required for the motor to reach the target gearshift speed does not increase (i.e., relative to the above described kick-down shift that decreases the rate of increase of the motor speed). Accordingly, vehicle acceleration is improved while still mitigating shock at the end of the kick-down shift.

Figure 3:
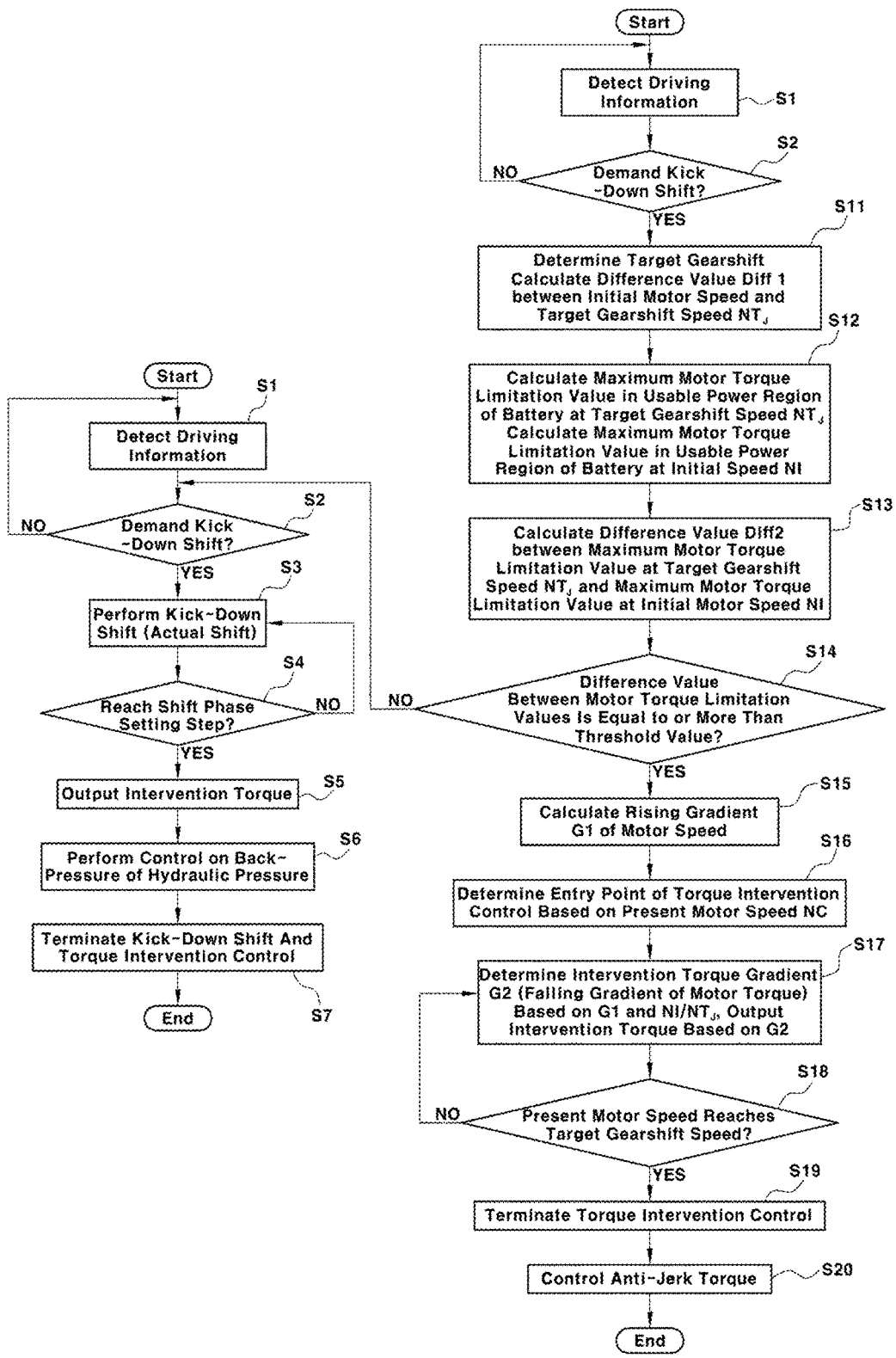
FIG. 3 is a flowchart illustrating a control process according to an embodiment of the present disclosure.
Figure 4:
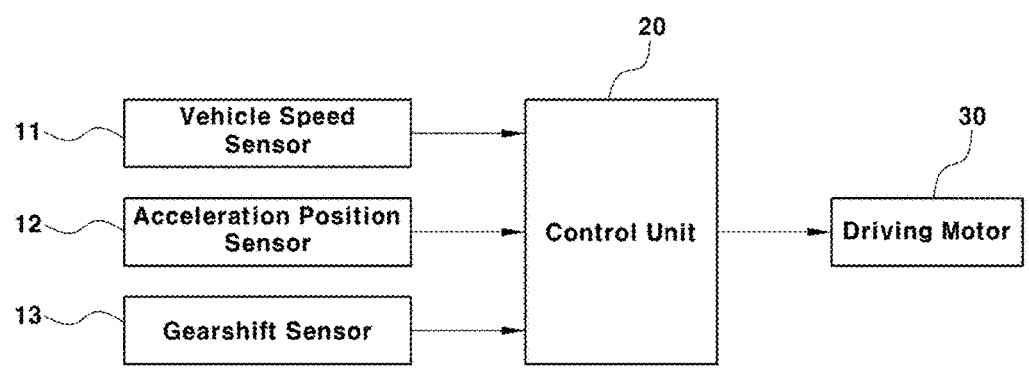
FIG. 4 is a block diagram illustrating a configuration of a system for performing the control process according to the illustrated embodiment of the present disclosure.

FIG. 3 is a flowchart illustrating a control process according to an embodiment of the present disclosure. FIG. 4 is a block diagram illustrating a configuration of a system for performing the control process according to the illustrated embodiment of the present disclosure.

FIG. 4 illustrates an example in which one integrated control unit 20 is used. However, the control unit 20 may be a control group including the hybrid control unit (HCU), the transmission control unit (TCU), the motor control unit (MCU), and a battery management system (BMS) which exchange information through intercommunication while performing coordinative control.

FIG. 5 is a view illustrating intervention torque, anti-jerk compensation torque, and the motor speed in the control process according to the illustrated embodiment of the present disclosure.

First, driving information is detected from the vehicle (S1). The detected driving information is input to the control unit 20.

The control unit 20 determines whether kick-down shift of the vehicle due to acceleration operation (namely, operation of an accelerator pedal) of the driver who wants rapid acceleration is required based on the input driving information (S2). Upon detection of demand for kick-down shift (namely, determining that kick-down shift is demanded), a target gearshift of kick-down shift and a target gearshift speed (the motor speed at a completion point of target shift) $NT_J$ are determined.

Herein, the driving information may include a vehicle driving speed detected by a vehicle speed sensor 11, a pedal actuation displacement detected by an accelerator position sensor (APS) 12, a present gearshift of the transmission detected at a gearshift sensor 13.

The vehicle speed sensor 11 may be a general vehicle sensor detecting the vehicle speed. For example, the vehicle speed may be detected based on an output value of a wheel speed sensor mounted at a wheel of the vehicle or a component may detect the vehicle speed from revolutions per minute of an output shaft of the transmission.

However, it is understood that the scope of the present disclosure is not limited thereto. Any component capable of detecting and calculating a value substantially corresponding to the vehicle speed may be applied to the inventive concept of the present disclosure.

The accelerator position sensor 12 may detect tip-in and tip-out of an accelerator pedal operated by the driver, and actuation displacement of a pedal. The accelerator position sensor 12 may be a general accelerator position sensor (APS). The accelerator position sensor 12 detects a position of the accelerator pedal to provide information on the position of the accelerator pedal as an electric signal to the control unit 20.

The gearshift sensor 13 detects a gearshift selected under a present driving condition to provide information on the selected gearshift to the control unit 20.

When kick-down shift demand is detected by pedal actuation displacement information (a position of the accelerator pedal or an open degree, which may be a general APS value) input from the accelerator position sensor 12, the control unit 20 determines the target gearshift based on present driving speed input at the vehicle speed sensor 11 and a pedal actuation displacement input at the accelerator position sensor 12. The control unit 20 calculates the target gearshift speed $NT_J$, i.e. the target motor speed corresponding to the target gearshift.

For example, upon demand for kick-down shift, after the transmission control unit (TCU) determines the target gearshift based on the present vehicle speed and the pedal actuation displacement, the transmission control unit (TCU) may be set to calculate the motor speed at a target completion point of kick-down shift, namely, the target gearshift speed $NT_J$, i.e. the motor speed at the determined target gearshift.

Herein, the processes for determination of the target gearshift and calculation of the target gearshift speed are the same as the processes in general kick-down shift control process, and thus a detailed description thereof is omitted.

Meanwhile, the control unit 20 calculates the motor speed before shift. The calculation or the detection of speed of the motor 30 in the vehicle is the same as the calculation or the detection of the speed of the motor in a general hybrid electric vehicle, and thus a detailed description thereof is omitted.

For example, a motor speed calculation unit of the motor control unit (MCU) may calculate the present speed of the motor 30 before shift. The hybrid control unit (HCU) may receive the motor speed information from the motor control unit (MCU).

Hereinafter, in this disclosure, the motor speed before kick-down shift, i.e. the motor speed after detection of demand for kick-down shift and before performance of shift, and the motor speed calculated or detected before an increase in speed, is referred to as an "initial motor speed NI".

Furthermore, during change and increase in speed in a process of kick-down shift, the motor speed calculated or detected at the motor control unit (MCU) in real time is referred to as a "present motor speed NC".

In addition, the control unit 20 determines the target gearshift and the target gearshift speed while calculating a difference value Diff1 between the target gearshift speed $NT_J$ and the initial motor speed NI (S11).

For example, the hybrid control unit (HCU) may be set to calculate the difference value Diff1 between the target gearshift speed $NT_J$ transmitted from the transmission control unit (TCU) and the initial motor speed NI transmitted from the motor control unit (MCU).

Then, the control unit 20 (e.g. the hybrid control unit) calculates maximum torque in a usable power region of the present battery when the motor 30 operates at the target gearshift speed, i.e. a predetermined maximum motor torque limitation value corresponding to the target gearshift speed $NT_J$ (i.e. the motor speed at the completion point of kick-down shift) in the usable power region of the present battery.

Furthermore, the control unit 20 (e.g. the hybrid control unit) calculates the predetermined maximum motor torque limitation value corresponding to the initial motor speed NI at the usable power region of the present battery (S12).

Subsequently, the control unit 20 calculates a difference value Diff2 between the motor torque limitation value at the initial motor speed NI and the motor torque limitation value at the target gearshift speed $NT_J$ (S13). The control unit 20 compares the difference value Diff2 with a predetermined threshold value to determine a method of torque intervention control (S14).

Namely, upon demand for kick-down shift, the target gearshift speed $NT_J$ calculated at the transmission control unit (TCU) before actual shift is transmitted to the hybrid control unit (HCU). After the hybrid control unit (HCU) calculates the maximum motor torque limitation value corresponding to the target gearshift speed ($NT_J$) at a usable power level of the present battery, the hybrid control unit (HCU) calculates the difference value Diff2 between the calculated maximum motor torque limitation value and the motor torque limitation value at the initial motor speed to compare the calculated difference value Diff2 with a threshold value. Herein, when the hybrid control unit (HCU) determines that the difference value Diff2 is equal to or more than the threshold value, torque intervention control is performed using the motor control unit (MCU) as a main control unit. When the hybrid control unit (HCU) determines that the difference value Diff2 is less than the threshold value, torque intervention control is performed using the transmission control unit (TCU) as a main control unit.

Hereinafter, in the present disclosure, torque intervention control in the case where the difference value Diff2 is equal to or more than the threshold value is referred to as first torque intervention control. Torque intervention control in the case where the difference value Diff2 is less than the threshold value is referred to as second torque intervention control.

First torque intervention control is a disclosed torque intervention control method in the present disclosure. As described below, in the control process, the first torque intervention control includes determining entry point of torque intervention based on the motor speed, controlling output of motor torque (intervention torque) decreased based on the predetermined gradient which is set by entry of torque intervention control (a process of variably outputting intervention torque), and stopping intervention torque output upon attainment of the target gearshift while controlling performance of torque output compensated by anti-jerk compensation torque (vibration reduction compensation torque) with respect to the input shaft of the transmission (i.e. the output shaft of the motor and the driveshaft).

Furthermore, second torque intervention control is a torque intervention control method. The second torque intervention control includes the torque intervention control (decrease control of torque output of the motor), in which when the motor speed is increased based on tip-in operation of the accelerator pedal of the driver while shift of the actual shift section proceeds to some extent, namely, when shift phases subdivided at the actual shift section reaches a predetermined shift phase, intervention torque (decreased motor torque) output is performed.

Herein, each torque intervention control is performed at the actual shift section of the process of kick-down shift. When the difference value Diff2 is less than the threshold value, the hybrid control unit (HCU) transmits second torque intervention control selectivity information to the transmission control unit (TCU). Then, the second torque intervention control is performed under cooperative control of the hybrid control unit (HCU), the transmission control unit (TCU), and the motor control unit (MCU).

That is, as illustrated in FIG. 2, the kick-down shift control process in which the gear is shifted to the target gearshift (downshift) is performed by the transmission control unit (TCU). When the predetermined shift phase at the actual shift section of the kick-down shift process is reached (S3 and S4), the transmission control unit (TCU) requests torque intervention to the hybrid control unit to continuously output motor torque decreased under the cooperative control of the hybrid control unit (HCU) and the motor control unit (MCU), i.e. intervention torque, for a certain time (S5).

Generally, since the entire shift process is subdivided into various sections in the TCU, the transmission control unit (TCU) performs predetermined shift control for each section. Herein, each section may be subdivided into various phases, each performing respective predetermined shift controls, based on specifications of the transmission control unit (TCU).

The shift phase may be differently subdivided or defined by the specifications of the transmission control unit (TCU). However, at least three sections, i.e. a shift preparation section, an actual shift section, and a shift termination section are commonly provided at the transmission control unit (TCU).

The actual shift section is a section for changing an actual gear ratio through control of hydraulic pressure. In the general kick-down shift process, the transmission control unit (TCU) may transmit hydraulic pressure, controlled by an internal component of the transmission using various information such as the present gearshift, the target gearshift, engine torque, and motor torque, thereby performing change of the gear ratio.

Additionally, the transmission control unit (TCU) provides present shift progress information, namely, information on the shift preparation section, the actual shift section, and the shift termination section (information on the beginning and termination of each section) to the other control units such as the hybrid control unit (HCU) and the motor control unit (MCU). Furthermore, the transmission control unit (TCU) may provide information on the present shift phase of the subdivided shift phases every section.

In addition, each friction component of the transmission is released or coupled based on a predetermined manner every shift control section of shift preparation, actual shift, and shift termination. Back-pressure control of hydraulic pressure is performed using a predetermined friction component of the friction components of the transmission.

In the second torque intervention control process of the present disclosure, as illustrated in FIG. 2, during performance of shift control for kick-down shift by the transmission control unit (TCU), back-pressure control of hydraulic pressure is performed using the predetermined friction component (S6). Then, after termination of shift, output of intervention torque is stopped, and thus torque intervention control is terminated (S7).

In addition, in step S13 of the present disclosure, when the difference value Diff2 between the calculated maximum motor torque limitation values is equal to or more than the threshold value, the hybrid control unit (HCU) transmits first torque intervention control selectivity information to the motor control unit (MCU). Subsequently, first torque intervention control is performed under cooperative control of the hybrid control unit (HCU), the transmission control unit (TCU), and the motor control unit (MCU).

Herein, during performance of kick-down shift under the control of the transmission control unit (TCU), the motor control unit (MCU) receives information that first torque intervention control is selected from the hybrid control unit (HCU), and calculates a rising gradient of the present motor speed after tip-in operation of the accelerator pedal of the driver, i.e. a rising gradient G1 of present motor speed NC calculated by the motor speed calculation unit (S15).

Subsequently, the motor control unit (MCU) determines an entry point of torque intervention control from present motor speed NC (S16). A point at which the present motor speed NC reaches the entry reference speed $N_{ref}$ is determined to be the entry point of torque intervention control.

Namely, when present motor speed NC reaches entry reference speed $N_{ref}$, torque intervention control (variable output control of intervention torque) starts.

The entry reference speed $N_{ref}$ may be determined based on the difference value Diff1 between the initial motor speed NI calculated in step S11 and the target gearshift speed $NT_J$. In an embodiment, when a first speed ratio value R1 is calculated from the difference value Diff1, the entry reference speed $N_{ref}$ may be calculated by adding the initial motor speed NC to a value obtained by multiplying the difference value Diff1 by the first speed ratio value R1 ($N_{ref}$=(Diff1× R1)+NC).

The first speed ratio value R1 is determined from the difference value Diff1 at a map. The map includes values based on the difference values Diff1. The map in which the first speed ratio value R1 is predetermined is provided. The map is used after being input and stored at the control unit 20 (e.g. the motor control unit) in advance.

Then, the motor control unit (MCU) calculates the rising gradient G1 of the motor speed calculated in step S15 and a gradient G2 of intervention torque (a falling gradient of intervention torque) from a ratio value of the initial motor speed Ni with respect to the target gearshift speed, i.e. a second speed ratio value R2 (R2=NI/$NT_J$). Torque intervention control, in which motor torque is decreased based on the calculated gradient G2, is performed (S17).

Namely, the motor control unit (MCU) performs variable output control of intervention torque which controls operation of the motor 30 to output decreased torque (intervention torque) based on the calculated gradient.

The intervention torque gradient G2 is determined from the rising gradient G1 of the motor speed and the second speed ratio value R2 at a map. The map includes values based on rising gradient G1 of the motor speed and the second speed ratio value R2. The map in which the intervention torque gradient G2 is predetermined is provided. The map is used after being input and stored at the control unit 20 (e.g. the motor control unit) in advance.

Then, when the present motor speed NC reaches the target gearshift speed $NT_J$, the motor control unit (MCU) terminates torque intervention control (S18 and S19). Subsequently, anti-jerk control is performed (S20).

According to the present disclosure, a falling gradient of motor torque is determined by the rising gradient (a rising ratio) of the motor speed and the ratio values R2 such that decreased motor torque may be controlled based on the gradient. Thereby, optimized variable control of intervention torque may be performed based on the rising ratio of the motor speed and shift progress.

In addition, intervention torque output is stopped at the point at which the motor speed NC reaches the target gearshift speed $NT_J$ (off control of intervention torque) to terminate torque intervention control. Thereby, optimized intervention torque output in the actual shift section may be performed while a decrease in driving force of the vehicle after termination of shift may be improved.

Upon shift, upon tip-in/tip-out operation of the accelerator pedal, or upon coupling of an engine clutch, vibration of the driveshaft (the input shaft of the transmission or the output shaft of the motor) and a vibration phenomenon such as shocks and jerks (momentary and rapid movement) are generated, thereby decreasing driving comfort and operability. To resolve the above problems, anti-jerk control is provided.

In the anti-jerk control process, anti-jerk compensation torque, i.e. vibration reduction compensation torque is calculated and motor torque is controlled so as to be compensated by the calculated vibration reduction compensation torque.

The anti-jerk control process includes obtaining the actual speed of the driveshaft in which torque of the driving motor for driving the vehicle is output, calculating a model speed of the driveshaft, obtaining a vibration element based on deviation between the obtained actual speed of the driveshaft and the calculated model speed, and generating vibration reduction compensation torque for reducing vibration of the driveshaft from the vibration element. In the present disclosure, anti-jerk control for generating vibration reduction compensation torque may be performed in order to reduce surge and jerk vibration which may be generated after the completion of actual shift.

Anti-jerk control of the present disclosure may be performed in accordance with a basic process using the same method as the anti-jerk control process. However, in terms of a map for determining a control variable value (ex, a gain value, a minimum value/a maximum value, etc.) used to calculate vibration reduction compensation torque in the control process, a different map from the map in anti-jerk control is applied such that differentiated anti-jerk torque compensation may be performed.

In the present disclosure, in the kick-down shift process due to demand of rapid acceleration of the vehicle, optimized torque intervention control and differentiated anti-jerk control are applied such that, as illustrated in FIG. 5, acceleration recognition time of the driver may be decreased (improvement of acceleration response) and marketability may be improved.

As apparent from the above description, in a process of kick-down shift due to acceleration demand for the vehicle, optimized torque intervention control and anti-jerk control are applied such that acceleration recognition time may be decreased. Acceleration response of the vehicle may be improved and marketability may be improved as well.

As described above, exemplary embodiments have been disclosed in this specification and the accompanying drawings. Although specific terms are used herein, they are just used for describing the present disclosure, but do not limit the meanings and the scope of the present disclosure disclosed in the claims. Accordingly, a person having ordinary knowledge in the technical field of the present disclosure will appreciate that various modifications and other equivalent embodiments can be derived from the exemplary embodiments of the present disclosure. Therefore, the scope of true technical protection of the present disclosure should be defined by the technical idea of the appended claims.

What is claimed is:

1. A method of controlling a hybrid electric vehicle comprising:
    detecting an initial motor speed, namely, a speed before shift of the motor upon detection of demand of kick-down shift due to the acceleration operation of the driver to determine a target gearshift speed, namely, a target motor speed at a completion point of kick-down shift at the control unit;

calculating a difference value between the initial motor speed and the target gearshift speed at the control unit;

determining a predetermined maximum motor torque limitation value respectively corresponding to the target gearshift speed and the initial motor speed in a usable power region of a present battery at the control unit;

determining a difference value between a maximum motor torque limitation value at the initial motor speed and a maximum motor torque limitation value at the target gearshift speed at the control unit; and comparing the difference value between the maximum motor torque limitation values with a predetermined threshold value, wherein, when the difference value between the maximum motor torque limitation values is equal to or more than the threshold value, steps a) to d) are performed at the control unit:

a) calculating a rising gradient of a motor speed increasing during kick-down shift based on a present speed of a motor for driving a vehicle which is detected at a control unit in real time, upon detection of demand of the kick-down shift due to acceleration operation of a driver;

b) calculating a falling gradient of intervention torque based on the rising gradient of the motor speed at the control unit;

c) determining an entry point of torque intervention control based on the present speed of the motor detected at the control unit in real time; and d) performing the torque intervention control for controlling driving of the motor in order to output intervention torque, namely, motor torque decreased based on the falling gradient of the intervention torque calculated from the determined entry point at the control unit.

2. The method according to claim 1, wherein the control unit determines that the entry point of torque intervention control is a point in which the present motor speed detected in real time reaches a predetermined entry reference speed.

3. The method according to claim 2, further comprising detecting an initial motor speed, namely, a speed before shift of the motor upon detection of demand of kick-down shift due to the acceleration operation of the driver to determine a target gearshift speed, namely, a target motor speed at a completion point of kick-down shift at the control unit, wherein the entry reference speed is determined by a difference value between the initial motor speed and the target gearshift speed at the control unit.

4. The method according to claim 3, wherein a first speed ratio value corresponding to the difference value between the initial motor speed and the target gearshift speed is obtained by a map at the control unit, and the entry reference speed is calculated by adding the initial motor speed to a value obtained by multiplying the difference value between the initial speed and the target gearshift speed by the first speed ratio value.

5. The method according to claim 1, further comprising detecting an initial motor speed, namely, a speed before shift of the motor upon detection of demand of kick-down shift due to the acceleration operation of the driver to determine a target gearshift speed, namely, a target motor speed at a completion point of kick-down shift at the control unit, wherein the falling gradient of the intervention torque is determined by the rising gradient of the motor speed, the initial motor speed, and the target gearshift speed.

6. The method according to claim 5, wherein the rising gradient of the motor speed and the falling gradient of the intervention torque corresponding to a second speed ratio value which is a ratio value of the initial motor speed with respect to the target gearshift speed, are determined at the control unit using a map.

7. The method according to claim 1, further comprising terminating the torque intervention control at the control unit when the present speed of the motor increasing during kick-down shift reaches the target gearshift speed.

8. The method according to claim 7, wherein, after termination of the torque intervention control, anti-jerk control is performed, and the anti-jerk control comprises:

obtaining an actual speed of a driveshaft in which torque of the motor is output;

calculating a model speed of the driveshaft;

obtaining a vibration element based on deviation between the obtained actual speed of the driveshaft and the calculated model speed;

calculating vibration reduction compensation torque for reducing vibration of the driveshaft from the vibration element; and controlling driving of the motor to output motor torque compensated by the calculated vibration reduction compensation torque.

9. The method according to claim 1, wherein the hybrid electric vehicle includes a transmission mounted electric device (TMED)-type hybrid electric vehicle in which a transmission is disposed at an output side of the motor.

\* \* \* \* \*